US012812395B2

(12) United States Patent
Taori et al.

(10) Patent No.: US 12,812,395 B2
(45) Date of Patent: Nov. 24, 2026

(54) LEVERAGING Wi-Fi PUNCTURED SUB-CHANNELS INFORMATION FOR ENHANCED CO-EXISTENCE

(71) Applicant: Cypress Semiconductor Corporation, San Jose, CA (US)

(72) Inventors: Rakesh Taori, McKinney, TX (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 311 days.

(21) Appl. No.: 18/532,393

(22) Filed: Dec. 7, 2023

(65) Prior Publication Data

US 2025/0193687 A1 Jun. 12, 2025

(51) Int. Cl.

*H04W 16/14* (2009.01)
*H04L 1/00* (2006.01)
*H04L 5/00* (2006.01)

(52) U.S. Cl.

CPC ........... *H04W 16/14* (2013.01); *H04L 1/0013* (2013.01); *H04L 5/0012* (2013.01)

(58) Field of Classification Search

CPC ..... H04W 16/14; H04W 84/12; H04W 88/06; H04W 88/10; H04W 72/542; H04L 1/0013; H04L 5/0012; H04L 5/0094

See application file for complete search history.

(56) References Cited

U.S. PATENT DOCUMENTS

| | | | | |
|---|---|---|---|---|
| 2016/0234644 | A1* | 8/2016 | Belghoul | G01S 5/0236 |
| 2019/0349848 | A1* | 11/2019 | Bali | H04J 3/1652 |
| 2021/0266925 | A1* | 8/2021 | Aly | G02B 27/01 |
| 2023/0308938 | A1* | 9/2023 | Sun | H04W 28/0278 |
| 2024/0306133 | A1* | 9/2024 | Chang | H04L 5/0053 |
| 2025/0081179 | A1* | 3/2025 | Aldana | H04W 72/1215 |
| 2025/0151042 | A1* | 5/2025 | Chu | H04W 28/20 |

OTHER PUBLICATIONS

WPAN—Wireless Personal Area Networks (Year: 2006).*

Evaluation of Energy Efficiency of IEEE 802. 15.4 CR-WSN under Interfered Environment (Year: 2007).*

* cited by examiner

*Primary Examiner* — Joseph E Avellino
*Assistant Examiner* — Anindita Sen

(57) ABSTRACT

A system and method are provided for co-existence in a wireless device including a co-located wireless local area network (WLAN) radio and a wireless personal area network (WPAN) radio. Generally, the method includes identifying a number of punctured sub-channels in channels used in a WLAN to communicate with the WLAN radio, and instructing the WPAN radio over which of the sub-channels to transmit and receive to reduce interference between the WPAN radio and communications between the WLAN radio and access point or station in the WLAN. The WLAN radio can be a Wi-Fi radio using an IEEE 802.11 protocol supporting preamble puncturing using a Punctured Sub-channel Bitmap in a physical layer protocol data unit, and the WPAN radio can be an unlicensed, short-range Bluetooth, Bluetooth low-energy, narrow-band or ultra-wideband radio. The WLAN radio can learn the punctured sub-channels from an access point, or request the sub-channels be punctured.

16 Claims, 8 Drawing Sheets

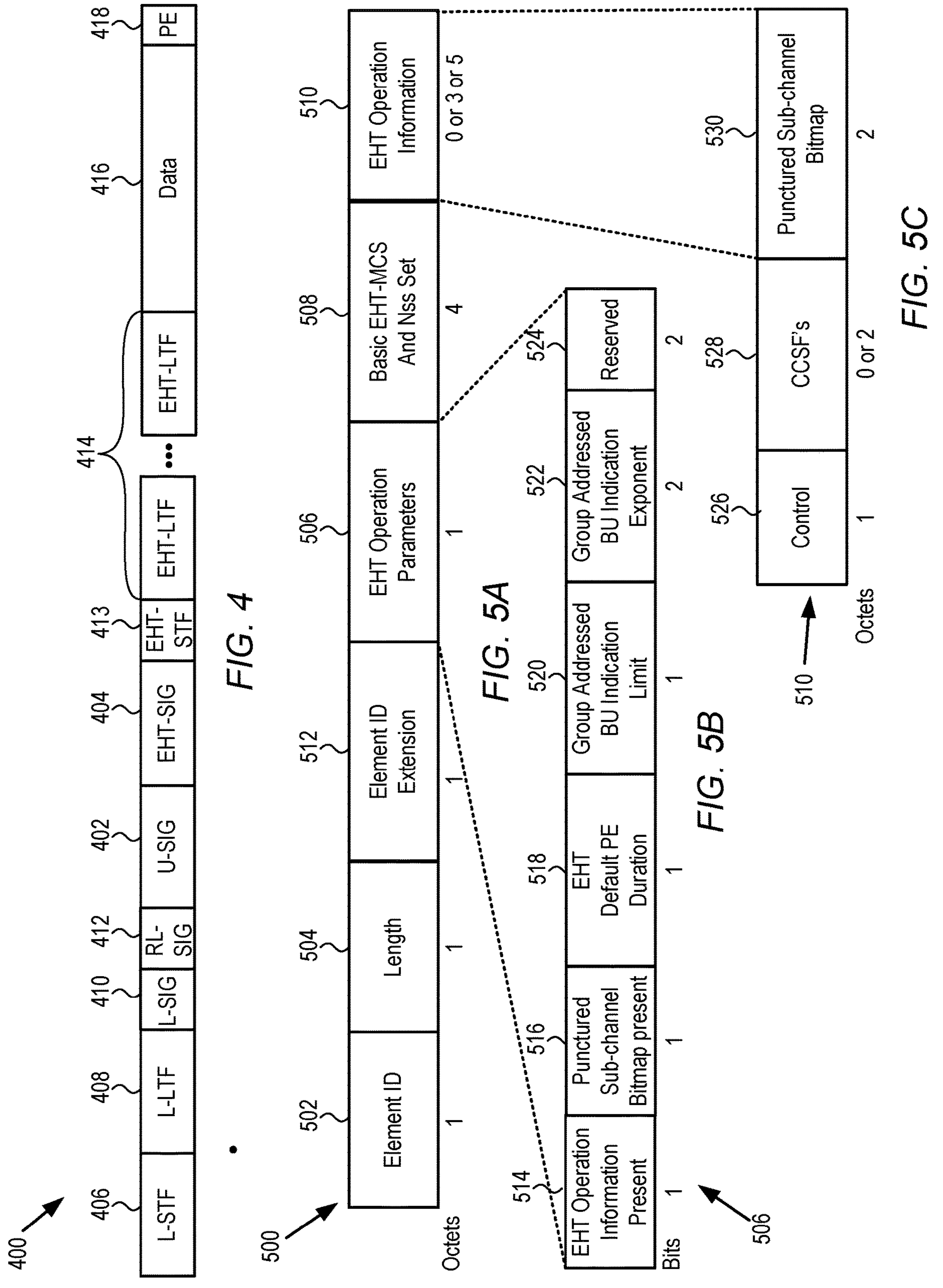
400
406
L-STF
408
L-LTF
410
L-SIG
412
RL-SIG
402
U-SIG
404
EHT-SIG
413
EHT-STF
414
EHT-LTF
EHT-LTF
416
Data
418
PE
FIG. 4
500
Octets
502
Element ID
1
504
Length
1
512
Element ID Extension
1
506
EHT Operation Parameters
1
508
Basic EHT-MCS And Nss Set
4
510
EHT Operation Information
0 or 3 or 5
FIG. 5A
506
Bits
514
EHT Operation Information Present
1
516
Punctured Sub-channel Bitmap present
1
518
EHT Default PE Duration
1
520
Group Addressed BU Indication Limit
1
522
Group Addressed BU Indication Exponent
2
524
Reserved
2
FIG. 5B
510
Octets
526
Control
1
528
CCSF's
0 or 2
530
Punctured Sub-channel Bitmap
2
FIG. 5C

| Channel Bandwidth | Cases | Puncturing Pattern | Field Value |
|---|---|---|---|
| 80 MHz | No puncturing | [1 1 1 1] | 0 |
| | 20 MHz punctured | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz punctured | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz punctured | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |

*FIG. 6*

| Channel Bandwidth | Cases | Puncturing Pattern | Field Value |
|---|---|---|---|
| | 320-80-40 | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

*FIG. 7*

LEVERAGING Wi-Fi PUNCTURED SUB-CHANNELS INFORMATION FOR ENHANCED CO-EXISTENCE

TECHNICAL FIELD

This disclosure relates generally to wireless communications, and, more particularly, to coexistence between multiple wireless technologies operating in the same frequency bands.

BACKGROUND

An increasing number of wireless devices, such as notebook computers, tablets, personal or mobile multimedia players, VoIP phones and multi-band cell phones, connect both through Wi-Fi and technologies, such as Bluetooth (BT) and Bluetooth low-energy (BLE) connecting in the same 2.4 GHz, 5 GHz and 6 GHz bands used by wireless local area networks (WLAN). Because the WLAN radio and BT/BLE radio are co-located within the same device, the co-existence of these two technologies cannot be achieved by simply creating a distance between the radios.

The problem of co-existence has been further exacerbated with the latest generation of devices, which require wider Wi-Fi channels. For example, the IEEE 802.11 standard for Wi-Fi 6 can occupy up to 160 MHz channels, while the standard for Wi-Fi 7 is up to 320 MHz channels, with even larger bandwidth channels envisioned for Wi-Fi 8 and beyond. Additionally, in the new IEEE 802.11 standard for Wi-Fi 6 (6 GHz) rules relating to contention based protocols (CBP), such as listen before talk (LBT), are no longer mandatory. Moreover, there is discussion on adding 5/6 GHz operation to the BT/BLE standards.

Accordingly, there is a need for systems and methods for new and improved coexistence schemes between pairs of mainstream wireless technologies, and more particularly between Wi-Fi communication protocols, and wireless technologies in unlicensed applications, like BT or BLE, that use pulses of radio waves in an overlapping spectrum of frequencies ranging from 2.4 to 6 GHz. It is further desirable that the system and method is fully compatible with existing IEEE 802.11 protocols.

SUMMARY

Disclosed is a wireless device including a co-located first, wireless local area network (WLAN) radio and a second, unlicensed short-range wireless personal area network (WPAN) radio, and method of operating the same to avoid or eliminate interference and provide co-existence between the first and second radios. Generally, the method includes identifying with the WLAN radio a number of punctured sub-channels in channels used in a WLAN or basic service set (BSS) to communicate with the WLAN radio, and instructing the WPAN radio over which of the sub-channels to transmit and receive to eliminate interference between the WPAN radio and communications between the WLAN and the Wi-Fi radio. The WLAN radio can identify the punctured sub-channels using a Punctured Sub-channel Bitmap in a preamble field of a physical layer protocol data unit (PPDU) transmitted from a WLAN access point (AP). The PPDU can be either transmitted directly to the WLAN radio or observed in a transmission from the WLAN AP to another WLAN station (STA) in the WLAN. Alternatively, the WLAN radio can transmit the PPDU to the WLAN AP with a request that the sub-channels be punctured.

In one embodiment, the wireless device includes, in addition to the WLAN and WPAN radio, a microcontroller operable to execute machine readable instructions that, when executed cause the WLAN radio to identify and communicate to the WPAN radio a number of punctured sub-channels in channels used in a WLAN or BSS to communicate with the WLAN radio, and cause the WPAN radio to transmit and receive using adaptive frequency hopping (AFH) over the number of punctured sub-channels, thereby eliminating interference between the WPAN radio and the WLAN radio.

The WLAN radio can include a Wi-Fi radio operable to use an IEEE 802.11 packet-based protocol supporting preamble puncturing, in which the number punctured sub-channels are identified using a Punctured Sub-channel Bitmap in a PPDU used in the WLAN. The WPAN radio can include a Bluetooth (BT) or Bluetooth low-energy (BLE) radio. The Wi-Fi radio can receive the PPDU with the Punctured Sub-channel Bitmap in a transmission directly from a WLAN AP, or by observing or 'sniffing' the PPDU in a transmission from the WLAN AP to another WLAN STA in the WLAN. Alternatively or additionally, the machine readable instructions can further include instructions that cause WPAN radio to inform the Wi-Fi radio of latency sensitive communications or traffic (LST), and the Wi-Fi radio to transmit a request including the PPDU to the WLAN AP that a number of sub-channels to be punctured.

Generally, each of the number of punctured sub-channels have a minimum bandwidth of 20 MHz, the each of the WLAN channels have a bandwidth of 80, 160 or 320 MHz, and the number of punctured sub-channels can include adjacent sub-channels to provide concurrently punctured sub-channels having bandwidths of 40, 80 or 120 MHz. However, it will be understood that the wireless device and method of the present disclosure will also operate with WLAN channels having a bandwidth of greater than 320 MHz, and/or with punctured sub-channels having bandwidths of less than 20 MHz.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 4 is a schematic block diagram illustrating an exemplary format of an extremely high throughput (EHT) physical layer protocol data unit (PPDU) used for multi-user communication in a BSS;

FIGS. 5A through 5C are schematic block diagrams illustrating an exemplary format of an EHT Operation element including a Punctured Sub-channel Bitmap;

FIG. 6 is a table illustrating various embodiments in which Wi-Fi with 80 megahertz (MHz), 160 MHz and 320 MHz bandwidth channels can be punctured at 20 MHz, 40 MHz or 80 MHz sub-channels;

FIG. 7 is a table illustrating various embodiments in which Wi-Fi with 320 MHz bandwidth channels can be concurrently punctured at 40 MHz and 80 MHz sub-channels;

DETAILED DESCRIPTION

Figure 1A:
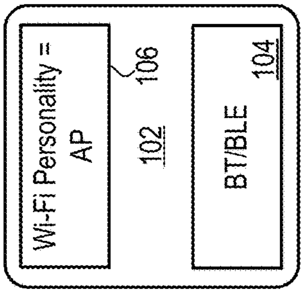
FIGS. 1A, 1*i*, 1C and 1D are schematic diagrams illustrating various embodiments of co-located Wi-Fi and Bluetooth (BT) or Bluetooth low-energy (BLE) (Wi-Fi/BT/BLE) devices in accordance with the present disclosure.

A wireless device including a co-located wireless local area network (WLAN) transceiver or radio and a wireless personal area network (WPAN) transceiver or radio operating in overlapping bands, and a method for operating the same to provide co-existence between the WLAN and WPAN radios is provided. Generally, the WLAN radio is a Wi-Fi radio compatible with one or more of the Institute of Electrical and Electronic Engineers (IEEE) 802.11 wireless standards or protocols, while the WPAN radio is an unlicensed, short-range radio operating a using a wireless technology such as Bluetooth (BT), Bluetooth low-energy (BLE), or a narrow-band (NB) or ultra-wideband (UWB) technology using an IEEE 802.15 standard or protocol.

Briefly, the method involves leveraging puncturing mechanisms introduced in the latest WLAN protocols, such as an IEEE 802.11ax or Wi-Fi 6, 802.11be or Wi-Fi 7 and later, for simultaneous communications in a wireless device including a WLAN radio and a co-located WPAN radio, such as a BT or BLE radio, to enable coexistence between WLAN and unlicensed, short-range BT or BLE communications. The WLAN radio identifies a number of punctured sub-channels in WLAN channels used in a WLAN or base service set (BSS) to communicate with the WLAN radio, and instructs the WPAN radio to communicate only over these punctured sub-channels thereby eliminating interference between communications between the WLAN and the unlicensed, BT or BLE, bands. The WPAN radio uses adaptive frequency hopping (AFH) within the bounds of a punctured 20 MHz sub-channel or a number of contiguous or non-contiguous sub-channels in an otherwise much wider WLAN channel, e.g. 80 MHz, 160 MHz or 320 MHz. The WLAN radio can operate as either a fixed or infrastructure access point (AP), a mobile-AP or non-AP client or station (STA). In some embodiments, the WLAN radio in the wireless device, hereinafter the co-located device, can initiate the method for coexistence by requesting an infrastructure or mobile-AP to puncture a number of sub-channels to facilitate WPAN communications. The request can be prompted by the WPAN radio informing the WLAN radio of latency sensitive communications or traffic (LST) prior to the Wi-Fi radio requesting the number of sub-channels be punctured.

A co-located device including a co-located WLAN radio and WPAN radio operating in overlapping bands, and a method for operating the same to provide co-existence between the WLAN and WPAN radios will now be described with reference to FIGS. 1 through 10. Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

FIGS. 1A through 1D illustrate various embodiments of co-located devices 102, each including a BT or BLE radio 104, and a WLAN or Wi-Fi radio 106 in which the Wi-Fi radio is one of several or of Wi-Fi personalities radios capable of communicating with other Wi-Fi radios in a BSS using an 802.11 protocol.

Referring to FIG. 1A, in a first embodiment the co-located device 102 includes a BT/BLE radio 104 and a Wi-Fi radio 106 configured or operable as an infrastructure Wi-Fi AP, that enables other Wi-Fi devices, such as stations (STA) or mobile access points (mobile-AP) in a BSS, to wirelessly connect to one another and the Wi-Fi AP.

Figure 1B:
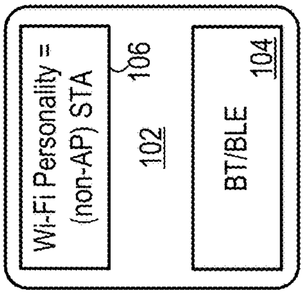

Referring to FIG. 1B, in a second embodiment the co-located device 102 includes a Wi-Fi radio 106 configured or operable as a non-AP Wi-Fi personality or Wi-Fi STA, such as a notebook or desktop computer, tablet, personal digital assistant or Wi-Fi phone.

Figure 1C:
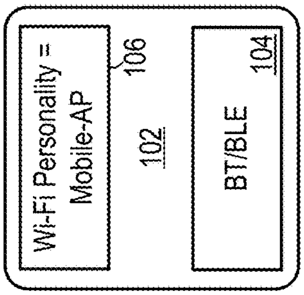

Referring to FIG. 1C, in a third embodiment, the co-located device 102 includes a Wi-Fi radio 106 configured or operable as a Wi-Fi hotspot or mobile-AP, such as in a vehicle, that enables other Wi-Fi STAs in the BSS to communicate with one another, and through a separate wireless technology, such as a cellular radio, to another wired or wireless network such as the Internet.

Figure 1D:
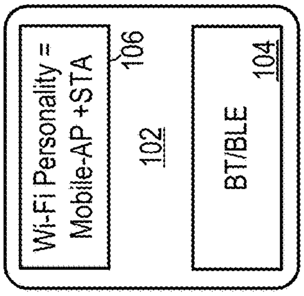

Finally, referring to FIG. 1D in a fourth embodiment, the co-located device 102 can include a Wi-Fi radio 106 configured or operable both as a mobile-AP and as a STA. That is in this embodiment the Wi-Fi radio 106 can operate both as a mobile-AP for a separate or second STA in the BSS, and as a STA coupling the second STA to an infrastructure Wi-Fi AP.

Figure 2A:
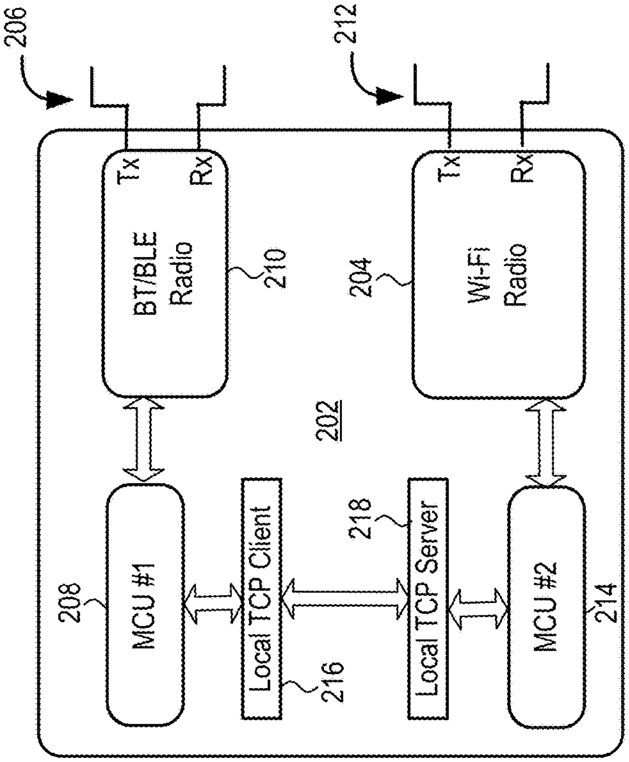
FIGS. 2A and 2B are schematic block diagrams illustrating various device architectures for co-located Wi-Fi/BT/BLE devices in accordance with the present disclosure.
Figure 2B:
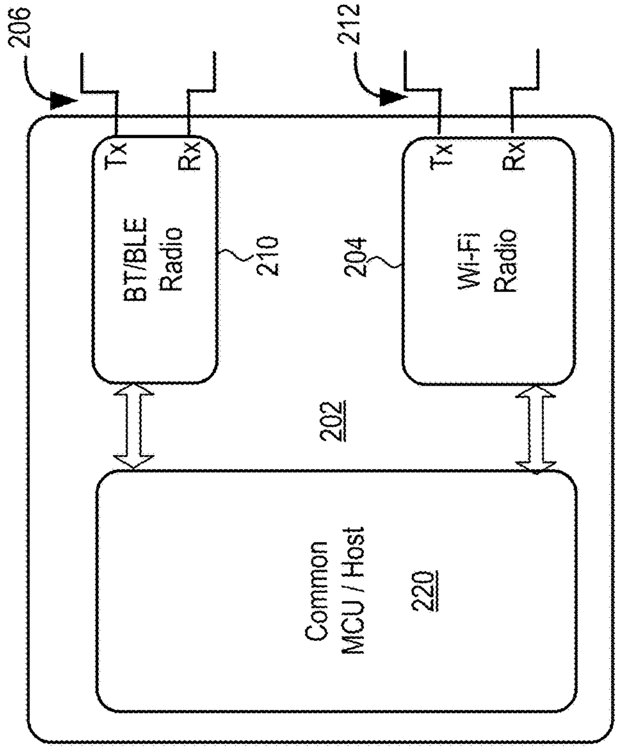

FIGS. 2A and 2B are schematic block diagrams illustrating various device architectures for co-located devices in accordance with the present disclosure. Referring to FIG. 2A, in a first embodiment the co-located device 202 includes a WLAN or Wi-Fi transceiver or radio (Wi-Fi radio 204) with one or more first antennas 206 to transmit (Tx) and receive (Rx) in 2.4, 5 and/or 6 GHz bands. The Wi-Fi radio 204 is coupled to a first microcontroller unit (MCU #1 208) configured to control operation of the Wi-Fi radio to communicate with other Wi-Fi STA or AP over 80 MHz, 160 MHz or 320 MHz channels using one or more IEEE 802.11 protocols. The co-located device 202 further includes a BT or BLE transceiver or radio (BT/BLE radio 210) with one or more second antennas 212 to transmit (Tx) and receive (Rx), and coupled to a second microcontroller unit (MCU #2 214) configured to control operation of the BT/BLE radio to communicate with to communicate with nearby BT or BLE devices. In the embodiment shown, the co-located device 202 further includes a local Transmission Control Protocol (TCP) client 216 and a local TCP server 218 for communicating data and radio status between the Wi-Fi radio 204 and the BT/BLE radio 210. The co-located device 202 can include a single integrated circuit (IC) with the Wi-Fi radio 204, the BT/BLE radio 210, MCU #1 208 and MCU #2 214, and the local TCP client 216 and TCP server 218 integrally formed on a single die or chip. Alternatively, the co-located 202 can be implemented as a number of separate circuits or ICs, combined in a multichip package or common chassis.

Referring to FIG. 2B, in a second embodiment the co-located device 202 includes a single common microcontroller unit or host (Common MCU/Host 220) coupled to the Wi-Fi radio 204 and the BT/BLE radio 210, configure to control operation of both the Wi-Fi radio and the BT/BLE radio, as well as communicate data therebetween. As with the embodiment shown in FIG. 2A, the co-located device 202 shown in FIG. 2B can be implemented as a single IC or as a number of separate circuits or ICs combined in a single multichip package or chassis.

In the past when the Wi-Fi radio 204 and BT/BLE radio 210 were largely limited to operation in the 2.4 GHz band, and the Wi-Fi radio used smaller 20 MHz channels, coexistence between the Wi-Fi radio and BT/BLE radio was achieved either by the BT/BLE radio being operated to hop around the channel in which the Wi-Fi radio is operating, or by Time Division Multiplexing (TDM) in which the MCU #1 208 through the MCU #2 214, or the Common MCU/Host 220, signals the BT/BLE radio that is clear or okay to transmit. Generally, the TDM mechanisms utilized contention-based protocols (CBP) or rules, such as a listen before talk (LBT) protocol, supported in earlier IEEE 802.11 protocols. However, the latest IEEE 802.11 protocols, e.g., 802.11ax or Wi-Fi 6 and 802.11be or Wi-Fi 7, no longer mandate such rules, and, as noted above, the latest generations of both Wi-Fi radio and BT/BLE radio operate in 2.4 GHz, 5 GHz and/or 6 GHz bands, with Wi-Fi channels of 80 MHz, 160 MHz or 320 MHz channels. Additionally, it is noted that future standards for BLE/BT, narrowband Internet-of-Things (NB-IoT), and New Radio Unlicensed (NR-U) may not include LBT mechanisms.

Figure 3:
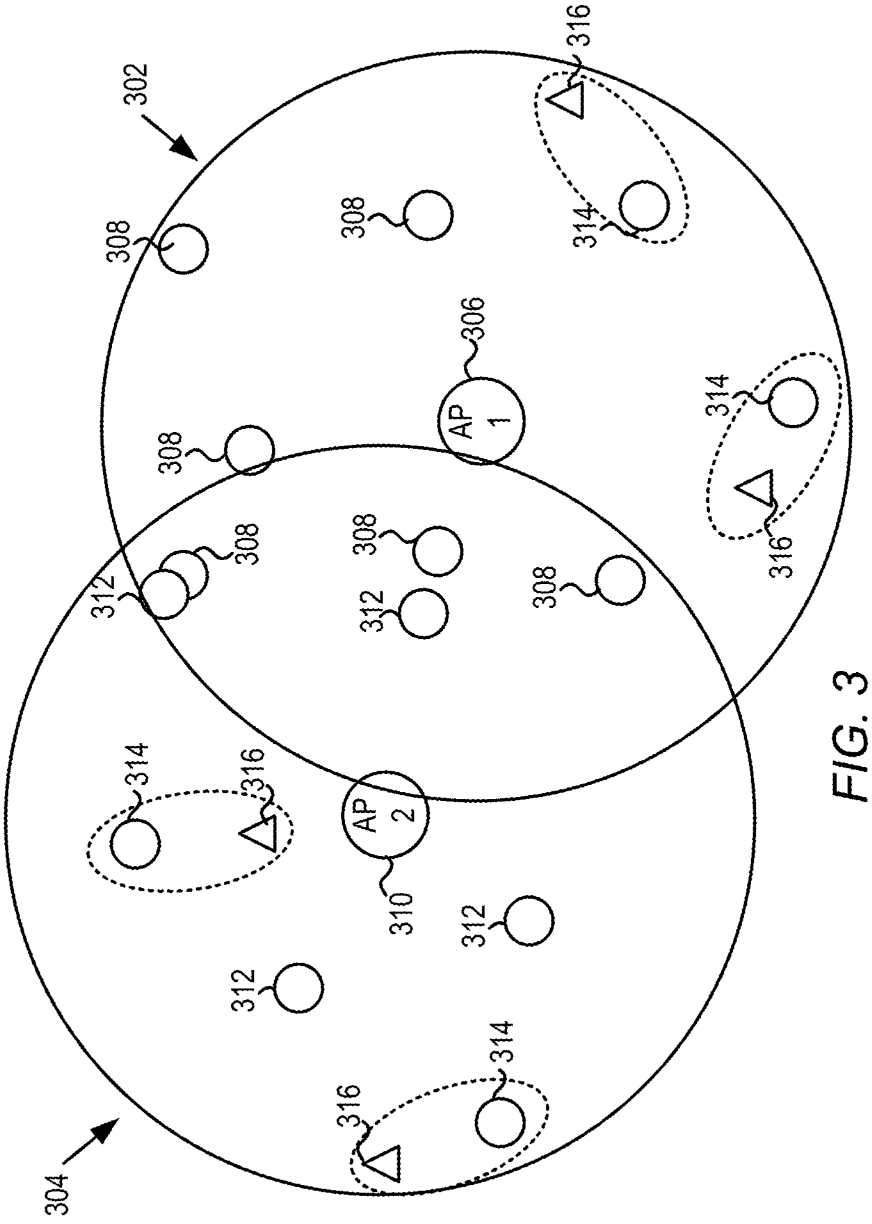
FIG. 3 is a schematic diagram illustrating overlapping Basic Service Set (BSS) networks, including co-located Wi-Fi and BT or BLE devices for which a system and method of the present disclosure is particularly useful.

FIG. 3 is a schematic diagram illustrating a first basic service set (1$^{st}$ BSS 302) and a second BSS (2$^{nd}$ BSS 304) with overlapping basic service areas (BSAs). By BSS it is meant a wireless network topology including a group of wireless devices, generally including a Wi-Fi access point (AP) and a number of Wi-Fi clients or stations (STA) that share physical-layer medium access characteristics (e.g. radio frequency, modulation scheme, security settings) such that they are wirelessly networked. Although not shown in this figure, the Wi-Fi AP is generally further configured or operable to enable the other Wi-Fi devices in the BSS to connect to a wired network, such as a local area network (LAN) or the Internet, either directly through the Wi-Fi AP or through a wired or wireless connection to a router.

Referring to FIG. 3, the 1$^{st}$ BSS 302 includes a first Wi-Fi AP (1$^{st}$ AP 306) and a number of associated first Wi-Fi STAs (1$^{st}$ STA 308), and the 2$^{nd}$ BSS 304 includes a second Wi-Fi AP (2$^{nd}$ AP 310) and a number of associated second Wi-Fi STAs (2$^{nd}$ STA 312). Additionally, in the embodiment shown, the 1$^{st}$ BSS 302 and 2$^{nd}$ BSS 304, each include a number of co-located devices 314 each including a WLAN or Wi-Fi transceiver or radio, and an unlicensed, short-range transceiver or radio, such as a Bluetooth (BT) or Bluetooth low-energy (BLE) radio, in wireless communication with a number of separate BT or BLE devices 316 in the overlapping BSAs.

Because the basic service areas of the 1$^{st}$ BSS 302 and 2$^{nd}$ BSS 304 overlap physically, when a spectrum or range of radio frequencies or channels used by the 1$^{st}$ AP 306 and 2$^{nd}$ AP 310, also overlap there is a potential for interference between each Wi-Fi AP and at least some of the associated Wi-Fi STAs 308 and 312. To prevent or mitigate this interference the latest generation of 802.11 standards, e.g., 802.11ax or Wi-Fi 6 and 802.11be or Wi-Fi 7, has introduced static preamble puncturing to enable a Wi-Fi AP to transmit and receive over a "punctured" portion of a channel if some sub-channels in the channel are being used by another device. For example, the 1$^{st}$ AP 306 can statically puncture, or disallow transmission over sub-channels within certain channels used by the 2$^{nd}$ AP 310 to enable coexistence between simultaneous transmissions in the 1$^{st}$ BSS 302 and the 2$^{nd}$ BSS 304. Information related to static preamble puncturing may be included or carried in a U-SIG and/or EHT-SIG field of a physical layer protocol data unit (PPDU) in a beacon transmitted from a Wi-Fi AP, or carried in response to a probe, association response, and re-association response from a Wi-Fi STA.

FIG. 4 is a schematic block diagram illustrating an exemplary format of a PPDU 400 including a universal signaling (U-SIG 402) and extremely high throughput signaling (EHT-SIG 404) fields which contain signaling data specific to IEEE 802.11be, including information related to preamble puncturing. Referring to FIG. 4 the PPDU generally further incudes a legacy short training field (L-STF 406), a legacy long training field (L-LTF 408); a legacy signal field (L-SIG 410; a legacy repeated signal field (RL-SIG 412); a EHT-STF 413; a EHT-LTF field 414; a Data field 416 and packet extension field (PE 418), all as defined or described in the IEEE 802.11be specification.

As noted, information related to preamble puncturing can be included within the U-SIG field 402 and/or the EHT-SIG field 404 of the PPDU 400. FIGS. 5A through 5C are schematic block diagrams illustrating an exemplary format of an EHT Operation element 500 included in an exemplary EHT-SIG field 404 of a PPDU 400. Referring to FIG. 5A the EHT operation element 500 generally includes an element identification (ID) field 502, a length field 504, an EHT operation parameters field 506, a basic EHT-MCS and Nss set field 508, an EHT operation information field 510, and, optionally, an element ID extension field 512. The element ID field 502, and, if present, the element ID extension field 512 identify the EHT operation element 500. The length field 504 indicates an overall length of the EHT operation element 500 as a number of 8-bit octets, and the basic EHT-MCS and Nss set field 508 indicates the EHT-MCSs that are supported by all EHT AP and STAs in the BSS. Generally all fields in the EHT operation element 500 are one octet in length, excluding the basic EHT-MCS and Nss set field 508, which is four octets, and the EHT operation information field 510, which may include zero, three or five octets depending on a number of sub-fields present.

Referring to FIG. 5B, the EHT operation parameters field 506 contains or includes multiple one or two bit sub-fields. These sub-fields include a one-bit EHT operation information present field 514 that if set indicates EHT information is present; a Punctured Sub-channel Bitmap Present field 516 that if set indicates a Punctured Sub-channel Bitmap is present; a EHT Default PE Duration subfield 518; a Group Addressed Bufferable Unit (BU) Indication Limit subfield 520; a two-bit Group Addressed BU Indication Exponent subfield 522, and a one or two-bit reserved subfield 524.

Referring to FIG. 5C, the EHT operation information field 510 contains multiple one or two octet subfields, including a control subfield 526 with information on channel width; one or more channel center frequency segment (CCFS) subfields 528; and a two octet or 16-bit Punctured Sub-channel Bitmap 530 subfield identifying sub-channels that are punctured. The Punctured Sub-channel Bitmap 530 is a 16-bit number in which the lowest numbered bit corresponds to the lowest frequency 20 MHz sub-channel that lies within the BSS channel bandwidth, and each successive bit corresponds to the next higher frequency 20 MHz sub-channel. A bit in the bitmap and that lies within the BSS bandwidth is set to 1 to indicate that the corresponding 20 MHz sub-channel is punctured (0 otherwise). Any bits in the bitmap that fall outside of the BSS bandwidth are reserved.

FIG. 6 is a table illustrating various embodiments in which Wi-Fi with 80 megahertz (MHz), 160 MHz and 320 MHz bandwidth channels can be punctured at 20 MHz, 40 MHz or 80 MHz sub-channels. In the table of FIG. 6 a "1" denotes a non-punctured sub-channel and an "x" denotes a punctured sub-channel. Referring to FIG. 6 it is noted that in the current 802.11 specifications, puncturing a sub-channel smaller than 20 MHz is not allowed. It is further noted that standardized static puncturing patterns punctured can include contiguous or non-contiguous 20 MHz, 40 MHz, 80 MHz, 160 MHz sub-channels. There is a 1-1 correspondence between the field value and the channel mask/puncture pattern. For example, for a Wi-Fi radio operating in a 80 MHz bandwidth PPDU can have punctured pattern of [1 x 1 1] for a field value of 2. Thus, a co-located device in the BSS would operate the associated BT/BLE radio to communicate using adaptive frequency hopping (AFH) around the second 20 MHz sub-channel within the 80 MHz channel.

FIG. 7 shows another table illustrating various embodiments in which Wi-Fi with 320 MHz bandwidth channels can be concurrently punctured by contiguous or non-contiguous 40 MHz and 80 MHz sub-channels. For example, for a Wi-Fi radio operating in a 320 MHz bandwidth PPDU can have punctured pattern of [x x1 1 x 1 1 1] for a field value of 15, in which the co-located device operate the BT/BLE radio to communicate using AFH in the first or lowest frequency 20 MHz sub-channels, and within the $5^{th}$ 20 MHz sub-channel.

Figure 8:
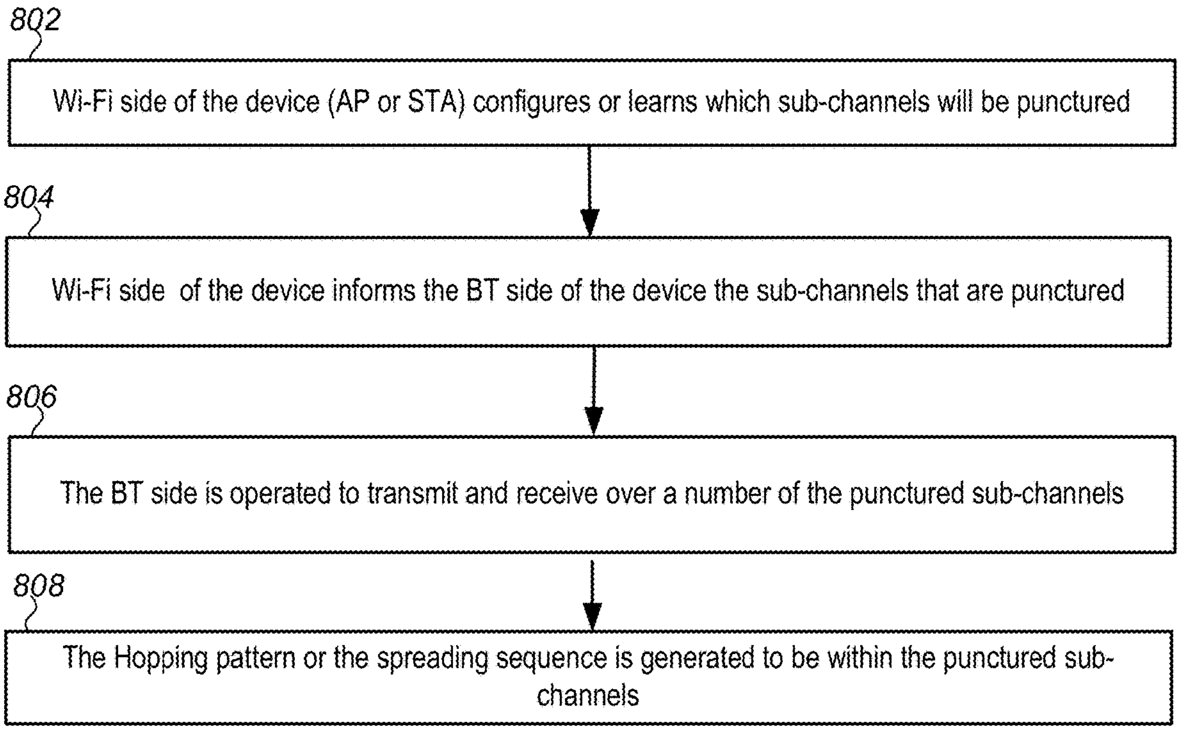
FIG. 8 is a flowchart illustrating a method by which a Wi-Fi side of a co-located Wi-Fi/BT/BLE device observes and informs the BT/BLE side of the co-located Wi-Fi/BT/BLE device, to enable concurrent BT/BLE communication over a number of punctured sub-channels.
Figure 9A:
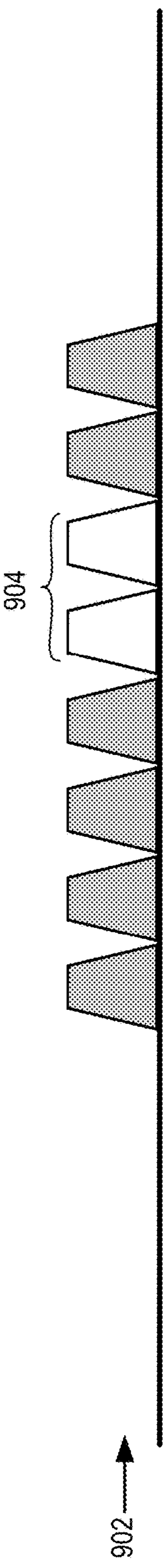
FIGS. 9A, 9B and 9C schematically illustrate punctured sub-channels within Wi-Fi channels according to various embodiments of the present disclosure.
Figure 9B:
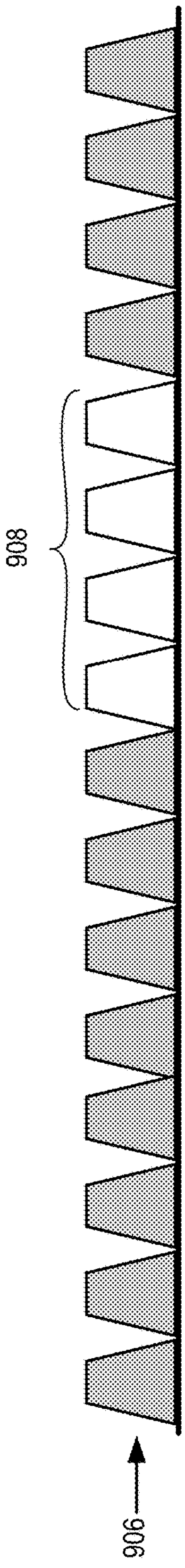
Figure 9C:
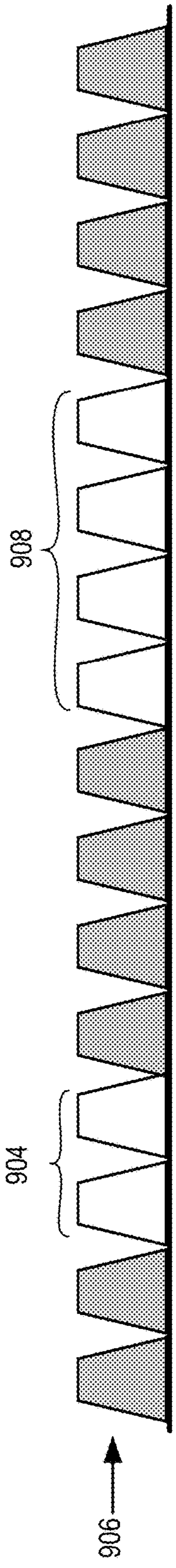

A method for operating a co-located device including a WLAN or Wi-Fi radio and a WPAN or BT/BLE radio to minimize or eliminate interference according to first embodiment, will now be described with reference to FIG. 8 and FIGS. 9A through 9C, where FIG. 8 is a flowchart illustrating the method, and FIGS. 9A through 9C schematically illustrate punctured sub-channels within Wi-Fi channels according to various embodiments of the present disclosure.

Referring to FIG. 8 the method begins with a MCU or common MCU/Host controlling a Wi-Fi radio on a Wi-Fi side of the co-located device identifying sub-channels that either are, or will be punctured (step 802). The co-located device can include any of the Wi-Fi types or personalities described above with reference to FIG. 1, including a fixed or infrastructure AP, a mobile-AP or a client or STA. The identification can be either by the Wi-Fi side configuring or selecting sub-channels to be punctured, and communicating a request to an AP, or by learning which sub-channels are already punctured. Generally, the identification can be accomplished using a Punctured Sub-channel Bitmap in a physical layer protocol data unit (PPDU) communicated (transmitted or received) in the BSS in which the co-located device operates. For example, where the co-located device is a Wi-Fi STA the Punctured Sub-channel Bitmap can include bitmap of statically punctured sub-channels punctured by an AP or mobile-AP based on previously sensed clear channel assessment (CCA) or received signal strength indicator (RSSI) of the sub-channels, and either directly addressed/transmitted to the Wi-Fi side of the co-located device or observed or 'sniffed' by the co-located device in a PPDU transmitted between the AP and another Wi-Fi AP or STA in the BSS.

Next, the Wi-Fi side of the co-located device informs a MCU or common MCU/Host controlling a BT/BLE radio on a BT/BLE side of the co-located device over which static punctured sub-channels the BT/BLE radio can communicate without interference (step 804). As shown above in FIG. 2A this information on static punctured sub-channels can be communicated through the local TCP client 216 and TCP server 218 in a co-located device 202 including separate first and second MCUs 208, 214, for controlling the Wi-Fi radio 204 and BT/BLE radio 210 respectively. Alternatively, the information on statically punctured sub-channels can be internally communicated in the common MCU/Host 220 as shown in FIG. 2B.

Finally, the BT/BLE radio is operated to transmit and receive over a number of the statically punctured sub-channels concurrently with Wi-Fi transmissions over other Wi-Fi channels, including non-punctured sub-channels (step 806). Preferably, the BT/BLE radio is operated to transmit and receive using adaptive frequency hopping (AFH) techniques by rapidly changing a carrier frequency of the BT/BLE communications to be within the statically punctured sub-channels (step 808).

It will be understood that the number of statically punctured sub-channels can include both contiguous or adjoining statically punctured sub-channels and non-contiguous statically punctured sub-channels. FIG. 9A schematically illustrates a 160 MHz Wi-Fi channel 902 including two, contiguous 20 MHz punctured sub-channels 904. Similarly, FIG. 9B illustrates a 320 MHz Wi-Fi channel 906 including four, contiguous 20 MHz punctured sub-channels 908, and FIG. 9C illustrates the 320 MHz Wi-Fi channel 906 including four, contiguous 20 MHz punctured sub-channels 908, separated from or non-contiguous with two, contiguous 20 MHz punctured sub-channels 904.

Figure 10:
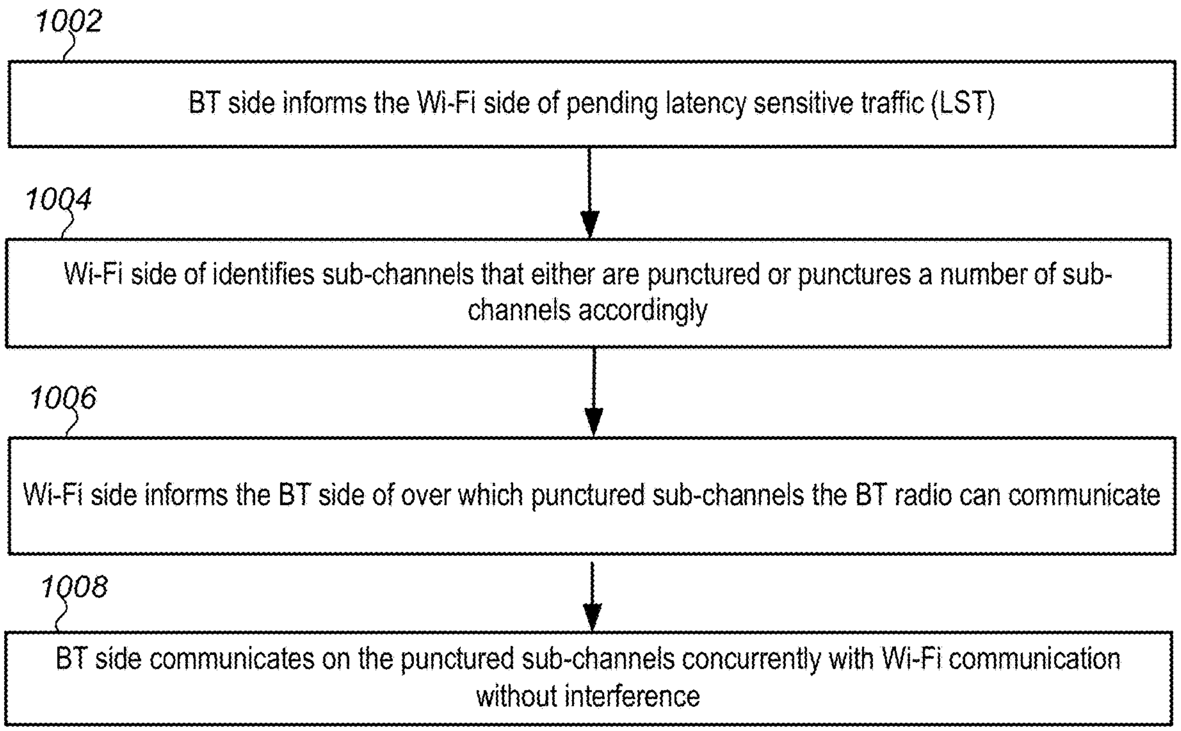
FIG. 10 is a flowchart illustrating a method by which latency sensitive traffic (LST) in a BT/BLE side of a co-located Wi-Fi/BT/BLE device triggers the Wi-Fi side, AP, mobile-AP or STA, to cause a number of sub-channels within the Wi-Fi bandwidth to be punctured to enable concurrent BT/BLE communication over the punctured sub-channels.

Alternatively, in another embodiment illustrated in the flowchart of FIG. 10, latency sensitive traffic (LST) in a BT/BLE side of a co-located device can trigger the Wi-Fi side to cause a number of sub-channels within the Wi-Fi bandwidth to be punctured to enable communication of enable concurrent BT/BLE communication over punctured sub-channels. Again, as with the method described with respect to FIG. 8, he co-located device can include any of the Wi-Fi types or personalities described with reference to FIG. 1, including a fixed or infrastructure AP, a mobile-AP or a client or STA.

Referring to FIG. 10, in this embodiment the method begins with the BT/BLE side of the co-located device informing the Wi-Fi side of the co-located device of the need to transmit LST (step 1002). This information on LST can be communicated through the local TCP client 216 and TCP server 218 in a co-located device 202 including separate first and second MCUs 208, 214, as shown in FIG. 2A, or internally communicated in the common MCU/Host 220, as shown in FIG. 2B. Next, the Wi-Fi side of identifies sub-channels that either are punctured or punctures a number of sub-channels accordingly (step 1004). Generally, where the co-located device is a mobile-AP or STA puncturing the sub-channels includes preparing and transmitting to an AP or another mobile-AP in the associated BSS a PPDU including a Punctured Sub-channel Bitmap along with a request that the sub-channels be punctured. Next, the Wi-Fi side of the co-located device informs a MCU or common MCU/Host controlling the BT/BLE radio on the BT/BLE side of the co-located device over which punctured sub-channels the BT/BLE radio can communicate without interference (step 1006). Finally, the BT/BLE radio is operated to transmit and receive over a number of the statically punctured sub-channels concurrently with Wi-Fi transmissions over other Wi-Fi channels, including non-punctured sub-channels (step 1008). Preferably, the BT/BLE radio is operated to transmit and receive using adaptive frequency hopping (AFH) techniques by rapidly changing a carrier frequency of the BT/BLE communications to be within the punctured sub-channels. As with the embodiment described above with respect to FIG. 8, the requested punctured sub-channels can include both contiguous and non-contiguous sub-channels, having a minimum bandwidth of 20 MHz, as shown in FIGS. 9A through 9C.

Finally, although the wireless device and method of the present disclosure has been described in detail with the number of punctured sub-channels having a minimum bandwidth of 20 MHz, and each of the WLAN channels have a bandwidth of 80, 160 or 320 MHz, it will be understood that the wireless device and method of the present disclosure will also operate with WLAN channels having a bandwidth of greater than 320 MHz, and/or with punctured sub-channels having bandwidths of less than 20 MHz.

Thus, a wireless device including a co-located wireless local area network (WLAN) radio and a wireless personal area network (WPAN) radio, and a method for operating the same to provide co-existence between the WLAN and WPAN radios have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method for operating a wireless device including a wireless local area network (WLAN) radio and a wireless personal area network (WPAN) radio to enable coexistence between WLAN and WPAN communications, the method comprising:

identifying a number of punctured sub-channels in a number of channels used in a basic service set (BSS) to communicate with the WLAN radio; and instructing the WPAN radio over which of the number of sub-channels to transmit and receive to reduce interference between the WPAN radio and communications between the WLAN and the WLAN radio, wherein the WLAN radio is a Wi-Fi radio operable to use an IEEE 802.11 packet-based protocol supporting preamble puncturing, and wherein the number of punctured sub-channels are identified using a Punctured Sub-channel Bitmap in a physical layer protocol data unit (PPDU) used for WLAN communications in the BSS, and wherein the Punctured Sub-channel Bitmap comprises a 16-bit bitmap, and wherein a lowest numbered bit in the 16-bit bitmap corresponds to a first sub-channel in one of the number of channels used in the WLAN to communicate with the Wi-Fi radio, and each successive bit in the 16-bit bitmap corresponds to a next higher sub-channel.

2. The method of claim 1 wherein the WPAN radio is an unlicensed, short-range Bluetooth (BT), Bluetooth low-energy (BLE), narrow-band (NB) or ultra-wideband (UWB) radio, operable to communicate by adaptive frequency hopping in the punctured sub-channels.

3. The method of claim 1 wherein the PPDU including the Punctured Sub-channel Bitmap is transmitted from a WLAN access point (AP) to the wireless device.

4. The method of claim 1 wherein the PPDU including the Punctured Sub-channel Bitmap is transmitted from a WLAN access point (AP) to a WLAN station (STA) in the BSS and observed by the Wi-Fi radio in the wireless device.

5. The method of claim 1 wherein the PPDU including the Punctured Sub-channel Bitmap is included in a transmission from the Wi-Fi radio to a WLAN access point (AP) requesting the number of punctured sub-channels be punctured to reduce interference with communication of the WPAN radio.

6. The method of claim 5 further comprising a step of a microcontroller unit controlling the WPAN radio informing the Wi-Fi radio of latency sensitive traffic (LST) prior to the Wi-Fi radio requesting the number of punctured sub-channels be punctured.

7. The method of claim 1 wherein each of the number of punctured sub-channels have a minimum bandwidth of 20 MHz, the each of the number of channels have a bandwidth of 80, 160 or 320 MHz, and wherein the number of punctured sub-channels includes adjacent sub-channels to provide concurrently punctured sub-channels having bandwidths of 40, 80 or 120 MHz.

8. A wireless device comprising:

a wireless local area network (WLAN) side including a WLAN radio;

a wireless personal area network (WPAN) side including a WPAN radio; and a microcontroller operable to execute machine readable instructions that, when executed by the microcontroller:

identifies a number of punctured sub-channels in channels used in a basic service set (BSS) for WLAN communications with the WLAN radio;

informs the WPAN radio of the number of punctured sub-channels; and instructs the WPAN radio to transmit and receive using adaptive frequency hopping (AFH) over the number of punctured sub-channels, whereby interference between the WPAN radio and WLAN communications with the WLAN radio is reduced, wherein the WLAN radio is a Wi-Fi radio operable to use an IEEE 802.11 packet-based protocol supporting preamble puncturing, and wherein the number of punctured sub-channels are identified using a Punctured Sub-channel Bitmap in a physical layer protocol data unit (PPDU) used for WLAN communications in the BSS, and wherein the Punctured Sub-channel Bitmap comprises a 16-bit bitmap, and wherein a lowest numbered bit in the 16-bit bitmap corresponds to a first sub-channel in one of the number of channels used in the WLAN to communicate with the Wi-Fi radio, and each successive bit in the 16-bit bitmap corresponds to a next higher sub-channel.

9. The wireless device of claim 8 wherein the WPAN radio is an unlicensed, short-range Bluetooth (BT), Bluetooth low-energy (BLE), narrow-band (NB) or ultra-wideband (UWB) radio.

10. The wireless device of claim 8 wherein the machine readable instructions comprise instructions that cause the microcontroller to identify the number of punctured sub-channels from a PPDU transmitted from a WLAN access point (AP) to the wireless device.

11. The wireless device of claim 8 wherein the machine readable instructions comprise instructions that cause the microcontroller to identify the number of punctured sub-channels in a PPDU transmitted from a WLAN access point (AP) to a WLAN station (STA) in the BSS and observed by the Wi-Fi radio in the wireless device.

12. The wireless device of claim 8 wherein the machine readable instructions comprise instructions that cause the WLAN radio to transmit the PPDU including the Punctured Sub-channel Bitmap to a mobile WLAN access point (AP) and request sub-channels be punctured to reduce interference between the WPAN radio and WLAN communications in the BSS.

13. The wireless device of claim 12 wherein the machine readable instructions comprise instructions that cause the microcontroller to inform the Wi-Fi radio of latency sensitive traffic (LST) pending for the WPAN radio prior to the Wi-Fi radio transmitting the request that the number punctured sub-channels to be punctured to the mobile WLAN AP.

14. A method for providing coexistence in a wireless device including co-located therein a Wi-Fi radio and a Bluetooth (BT) radio, the method comprising:

operating the Wi-Fi radio using an IEEE 802.11 packet-based protocol supporting preamble puncturing;

identifying a number of punctured sub-channels in a number of channels used in a basic service set (BSS) to communicate with the Wi-Fi radio;

instructing the BT radio over which of the number of sub-channels to transmit and receive to reduce interference between the BT radio and Wi-Fi communications in the BSS; and operating the BT to transmit and receive using adaptive frequency hopping (AFH) in the number of punctured sub-channels, wherein the WLAN radio is a Wi-Fi radio operable to use an IEEE 802.11 packet-based protocol supporting preamble puncturing, and wherein the number of punctured sub-channels are identified using a Punctured Sub-channel Bitmap in a physical layer protocol data unit (PPDU) used for WLAN communications in the BSS, and wherein the Punctured Sub-channel Bitmap comprises a 16-bit bitmap, and wherein a lowest numbered bit in the 16-bit bitmap corresponds to a first sub-channel in one of the number of channels used in the WLAN to communicate with the Wi-Fi radio, and each successive bit in the 16-bit bitmap corresponds to a next higher sub-channel.

15. The method of claim 14 wherein the PPDU including the Punctured Sub-channel Bitmap is transmitted from a Wi-Fi access point (AP) to the Wi-Fi radio in the wireless device.

16. The method of claim 14 wherein the PPDU including the Punctured Sub-channel Bitmap is transmitted from a Wi-Fi access point (AP) to a Wi-Fi station (STA) in the BSS and observed by the Wi-Fi radio.

* * * * *